United States Patent
Baek et al.

(10) Patent No.: US 9,002,337 B2
(45) Date of Patent: Apr. 7, 2015

(54) ELECTRONIC DEVICE INCLUDING MULTIPLE SIM CARDS AND METHOD THEREOF

(71) Applicant: Samsung Electronics Co. Ltd., Suwon-si, Gyeonggi-do (KR)

(72) Inventors: In-Ho Baek, Yongin-si (KR); Young-Jae Meen, Seoul (KR); Tae-Ho Shin, Yongin-si (KR); Won-Pyo Hong, Seoul (KR); Yong-Kyoung Yoon, Seoul (KR); Ja-Mi Rhee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/923,898

(22) Filed: Jun. 21, 2013

(65) Prior Publication Data
US 2014/0024353 A1  Jan. 23, 2014

(30) Foreign Application Priority Data
Jul. 19, 2012  (KR) .......................... 10-2012-0078853

(51) Int. Cl.
| | | |
|---|---|---|
| H04M 3/42 | (2006.01) | |
| H04W 4/16 | (2009.01) | |
| H04W 8/24 | (2009.01) | |
| H04W 88/06 | (2009.01) | |

(52) U.S. Cl.
CPC .............. *H04W 4/16* (2013.01); *H04W 8/245* (2013.01); *H04W 88/06* (2013.01)

(58) Field of Classification Search
CPC ......... H04W 4/16; H04W 8/245; H04W 4/12; H04B 1/3816
USPC ............................... 455/417, 418, 558, 412.1
See application file for complete search history.

(56) References Cited

U.S. PATENT DOCUMENTS

| | | | |
|---|---|---|---|
| 2008/0064443 A1* | 3/2008 | Shin et al. ................... 455/558 |
| 2009/0104939 A1 | 4/2009 | Lee | |
| 2011/0012987 A1* | 1/2011 | Yoon .......................... 348/14.02 |
| 2012/0077494 A1 | 3/2012 | Kim et al. | |
| 2012/0135715 A1* | 5/2012 | Kang et al. ................. 455/412.1 |
| 2012/0178500 A1 | 7/2012 | Hwang | |
| 2013/0337792 A1* | 12/2013 | Vanghi .......................... 455/417 |

FOREIGN PATENT DOCUMENTS

EP  2 475 215 A1  7/2012

OTHER PUBLICATIONS

"Erste Eindrücke: Mit dem Dual-SIM-Handy unterwegs", Internet Citation, Mar. 14, 2007, pp. 1-9, XP002508367.

* cited by examiner

*Primary Examiner* — Danh Le
(74) *Attorney, Agent, or Firm* — Jefferson IP Law, LLP (57) ABSTRACT

An operating method of an electronic device including at least two multiple Subscriber Identity Module (SIM) cards, includes receiving a call to a phone number assigned to a second SIM card during a call to a phone number assigned to a first SIM card among the multiple SIM cards, checking a call forwarding order fixed between the multiple SIM cards, and forwarding the call to the second SIM card phone number, to the first SIM card phone number according to the fixed order.

23 Claims, 6 Drawing Sheets

FIG.6

ELECTRONIC DEVICE INCLUDING MULTIPLE SIM CARDS AND METHOD THEREOF

PRIORITY

The present application claims the benefit under 35 U.S.C. §119(a) to a Korean patent application filed in the Korean Intellectual Property Office on Jul. 19, 2012, and assigned Serial No. 10-2012-0078853, the entire disclosure of which is hereby incorporated by reference.

BACKGROUND OF THE INVENTION

1. Field of the Invention

The present invention relates to an electronic device and a method thereof. More particularly, the present invention relates to an electronic device including multiple Subscriber Identity Module (SIM) cards and a method thereof.

2. Description of the Related Art

As an electronic device including multiple Subscriber Identity Module (SIM) cards is developed, a user, who has used two or more electronic devices, can use two or more phone numbers at the same time by inserting the respective SIM cards into the single electronic device. The electronic device including the multiple SIM cards is able to concurrently use two or more network services and is able to use a with separate phone numbers for a personal purpose and a business purpose respectively.

However, during the call to the phone number assigned to one SIM card, an electronic device of the related art including multiple SIM cards cannot make a call to the phone number assigned to the other SIM card. That is, when the user makes a call with the phone number assigned to one of the multiple SIM cards and a call request is received at the phone number assigned to the other SIM card, the user cannot check the call and thus misses the call.

In this regard, even when the call is received to the phone number assigned to the other SIM card during the call being the main function of the electronic device including the multiple SIM cards, a method is desired for securely receiving the call without missing the call.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for securely receiving a call when the call is received to a phone number assigned to one Subscriber Identity Module (SIM) card of multiple SIM cards during a call using a phone number assigned to another SIM card of the multiple SIM cards.

Another aspect of the present invention is to provide an apparatus and a method for holding a current call when another call is received at a phone number assigned to one SIM card of multiple SIM cards during the call using a phone number assigned to another SIM card of the multiple SIM cards.

Yet another aspect of the present invention is to provide an apparatus and a method for preventing a missing call in an infinite loop when a user sets an incorrect call forwarding function.

Still another aspect of the present invention is to provide an apparatus and a method for immediately executing a smart multi SIM function even when a SIM card of an electronic device is replaced by another SIM card.

According to one aspect of the present invention, an operating method of an electronic device including at least two multiple SIM cards is provided. The method includes receiving a call to a phone number assigned to a second SIM card during a call to a phone number assigned to a first SIM card among the multiple SIM cards, checking a call forwarding order fixed between the multiple SIM cards, and forwarding the call to the second SIM card phone number, to the first SIM card phone number according to the fixed order.

The method may further include determining no service area with the second SIM card phone number.

The method may further include determining that a smart multi SIM card function is set between the multiple SIM cards.

The smart multi SIM card function may include a call waiting function which holds the call to any one of the multiple SIM cards.

The smart multi SIM card function may include a call forwarding function which, when a call to another SIM card phone number is received during a current call to any one of the multiple SIM cards, redirects the call to the other SIM card phone number, to the SIM card phone number of the current call according to the fixed order.

The smart multi SIM card function may include a dynamic call diverting function which immediately executes the smart multi SIM card function when a SIM card other than the inserted multiple SIM cards is inserted.

The smart multi SIM card function may include an avoiding infinite loop function which displays an error message when a setting for always activating the call forwarding function or a setting for setting the call forwarding function for the call is selected among settings of the call forwarding function.

The order may be fixed such that a SIM card for forwarding the call redirects the call to only one of the multiple SIM cards and the SIM card for receiving the forwarded call receives the forwarded call from only one of the multiple SIM cards so that every SIM card forwards the call to any one SIM card at least once and receives the forwarded call from any one SIM card at least once.

The forwarding of the call to the second SIM card phone number, to the first SIM card phone number according to the fixed order may include forwarding to any one card which is set to a next order of the second SIM card, and repeating the call forwarding in the fixed order until the SIM card receiving the forwarded call is identified as the first SIM card.

The operating method may further include when the SIM card receiving the forwarded call is identified as the first SIM card, displaying a message inquiring about whether to receive the call to the second SIM card phone number using the first SIM card phone number.

The forwarding of the call to the second SIM card phone number, to the first SIM card phone number according to the fixed order may include confirming that the call forwarding order is fixed to the first SIM card, the second SIM card, the third SIM card, and the first SIM card, determining that the call is not allowed at the third SIM card phone number when the call is not allowed at the second SIM card phone number, forwarding the call to the third SIM card which is set to a next order of the second SIM card, determining no service area with the third SIM card phone number, and forwarding the call to the first SIM card which is set to a next order of the third SIM card.

According to another aspect of the present invention, an electronic device including at least two multiple SIM cards is provided. The electronic device includes a communication module for receiving a call to a phone number assigned to a second SIM card during a call to a phone number assigned to a first SIM card among the multiple SIM cards, and a processor unit for checking a call forwarding order fixed between the multiple SIM cards, and forwarding the call to the second SIM card phone number, to the first SIM card phone number according to the fixed order.

The processor unit may determine no service area with the second SIM card phone number.

The processor unit may determine that a smart multi SIM card function is set between the multiple SIM cards.

The smart multi SIM card function may include a call waiting function which holds the call to any one of the multiple SIM cards.

The smart multi SIM card function may include a call forwarding function which, when a call to another SIM card phone number is received during a current call to any one of the multiple SIM cards, redirects the call to the other SIM card phone number, to the SIM card phone number of the current call according to the fixed order.

The smart multi SIM card function may include a dynamic call diverting function which immediately executes the smart multi SIM card function when a SIM card other than the inserted multiple SIM cards is inserted.

The smart multi SIM card function may include an avoiding infinite loop function which displays an error message when a setting for always activating the call forwarding function or a setting for setting the call forwarding function for the call is selected in detailed among settings of the call forwarding function.

The order may be fixed such that a SIM card for forwarding the call redirects the call to only one of the multiple SIM cards and the SIM card for receiving the forwarded call receives the forwarded call from only one of the multiple SIM cards so that every SIM card forwards the call to any one SIM card at least once and receives the forwarded call from any one SIM card at least once.

The processor unit may forward to any one card which is set to a next order of the second SIM card, and repeat the call forwarding in the fixed order until the SIM card receiving the forwarded call is identified as the first SIM card.

The electronic device may further include a touch screen for, when the SIM card receiving the forwarded call is identified as the first SIM card, displaying a message inquiring about whether to receive the call to the second SIM card phone number using the first SIM card phone number.

The processor unit may confirm that the call forwarding order is fixed to the first SIM card, the second SIM card, the third SIM card, and the first SIM card, determine that the call is not allowed at the third SIM card phone number when the call is not allowed at the second SIM card phone number, forward the call to the third SIM card which is set to a next order of the second SIM card, determine no service area with the third SIM card phone number, and forward the call to the first SIM card which is set to a next order of the third SIM card.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device including multiple Subscriber Identity Module (SIM) cards can include two or more SIM cards in the single electronic device. More specifically, one SIM card contains subscriber information including a phone number assigned to the card. That is, one phone number is assigned to one SIM card, and the electronic device including two or more SIM cards can use as many phone numbers as the number of SIM cards in the single electronic device. For example, the single electronic device can include a plurality of SIM cards registered to different telecommunications operators and thus utilize two or more network services at the same time. Also, the single electronic device may include a plurality of SIM cards registered for a personal phone number and a business phone number, to separate a personal call and a business call.

Herein, a smart multi SIM card function is provided by the electronic device including two or more SIM cards, and can include a call waiting function, a call forwarding function, a dynamic call diverting function, and an avoiding infinite loop function. In more detail, the call waiting function suspends an incoming call during the call to the phone number assigned to one of the multiple SIM cards. When a call is received at the phone number assigned to the one SIM card during the call at the phone number assigned to another one of the multiple SIM cards, the call forwarding function redirects the incoming call of the one SIM card phone number to the current call phone number according to a preset order. The dynamic call diverting function allows the immediate execution of a multi SIM active function even when a SIM other than the current multiple SIM cards is inserted. For example, even when one more SIM card is inserted in addition to three SIM cards in the electronic device, the multi SIM active function is immediately set between the four SIM cards. Likewise, even when one SIM card is removed from the four SIM cards of the electronic device, the multi SIM active function is sustained between the three SIM cards. The avoiding infinite loop function prevents the electronic device from missing the call because of the infinite loop. More specifically, an error message is displayed when the call forwarding function out of the service area is overlappingly selected with a manual for setting ACTIVATE ALWAYS or ACTIVATE FOR CALL between the multiple SIM cards among detailed manuals of the call forwarding function.

Figure 1:
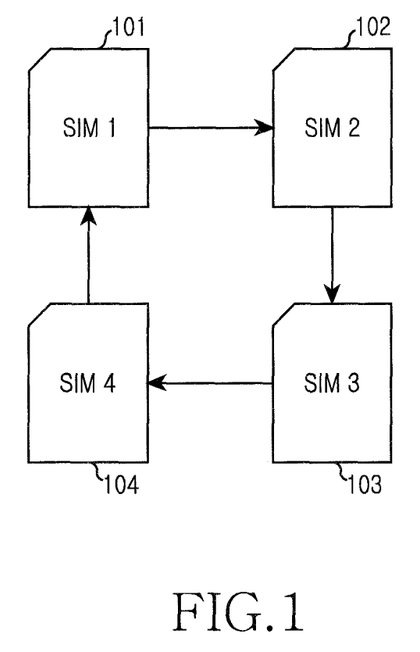
FIG. 1 illustrates a call forwarding order between multiple Subscriber Identity Module (SIM) cards according to an exemplary embodiment of the present invention.

FIG. 1 depicts a call forwarding order between multiple SIM cards according to an exemplary embodiment of the present invention. The electronic device can include two or more SIM cards according to an exemplary embodiment of the present invention. Herein, it is assumed that the electronic device includes four SIM cards. Hereafter, the call forwarding order between four SIM cards is explained. Herein, the order can redirect the call such that the SIM card for forwarding the call redirects the call only to one of the multiple SIM cards, and the SIM card receiving the forwarded call receives the call only from one of the multiple SIM cards. In further detail, the electronic device forwards the call according to a fixed order, and the fixed order implies that the SIM card for forwarding the call merely redirects the call to only one SIM card, not to two or more SIM cards at the same time. Likewise, the SIM card merely receives the forwarded call from only one SIM card, not from two or more SIM cards at the same time. Yet, the two or more SIM cards of the electronic device should forward the call at least once and receive the forwarded call at least once.

Referring to FIG. 1, the call forwarding function is set in an order of a first SIM card 101, a second SIM card 102, a third SIM card 103, and a fourth SIM card 104. In detail, the call forwarding function of FIG. 1 satisfies the fixed order, which is described above, that the SIM card for forwarding the call merely redirects the call to only one SIM card and the SIM card merely receives the forwarded call from only one SIM card. When an electronic device of the related art including the multiple SIM cards is engaged with the call to the phone number assigned to one SIM card and receives the call request to the phone number assigned to another SIM card, it misses the call because the call is not forwarded to the current SIM card. In more detail, when the electronic device including two or more SIM cards is engaged with the call to the phone number assigned to one SIM card and receives the call request to the phone number assigned to another SIM card, the call is forwarded to the current SIM card only when the call forwarding is set from the SIM card receiving the call request to the current SIM card. For example, when the user is engaged with the call to the phone number assigned to the first SIM card 101 and receives the call request to the phone number assigned to the third SIM card 103, the call is forwarded only when the user presets the call forwarding function from the third SIM card 103 to the first SIM card 101. To address this shortcoming, he call forwarding order is set such that every SIM card forwards the call to any one SIM card at least once and receives the call from any one SIM card at least once because the SIM card for forwarding the call can redirect the call to only one SIM card and the SIM card can receive the forwarded call from only one SIM card. That is, even when the user is engaged with the call to the phone number assigned to the first SIM card 101 and receives the call request to the phone number assigned to the third SIM card 103, the call is forwarded from the third SIM card 103 to the first SIM card 101 and accordingly the user can receive the call at the phone number of the first SIM card 101 without missing the call to the third SIM card 103. Hence, the call forwarding function being the proper function of the electronic device including the multiple SIM cards is available to use as many phone numbers as the number of SIM cards at the same time in the single electronic device.

Another call forwarding is serviceable in the opposite order of FIG. 1. For example, the call forwarding may be set to the order of the first SIM card 101, the fourth SIM card 104, the third SIM card 103, and the second SIM card 102. In more detail, the call forwarding order can differ if it satisfies a rule that the SIM card for forwarding the call can redirect the call to only one SIM card and the SIM card can receive the forwarded call from only one SIM card in the electronic device. Likewise, the call forwarding may be set in the order of the first SIM card 101, the third SIM card 103, the second SIM card 102, and the fourth SIM card 104, or in the order of the first SIM card 101, the second SIM card 102, the fourth SIM card 104, and the third SIM card 103. That is, the order can vary only if it satisfies the call forwarding rule.

Figure 2:
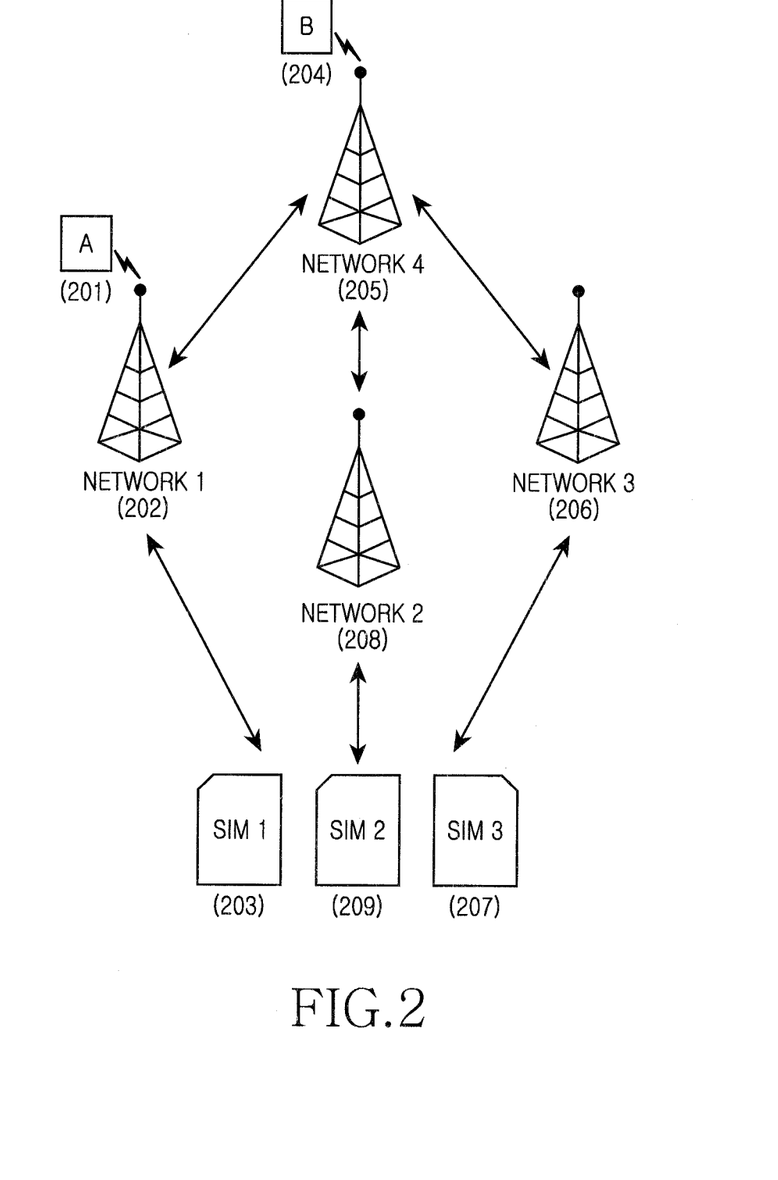
FIG. 2 illustrates a forwarded call reception according to an exemplary embodiment of the present invention.

FIG. 2 depicts a forwarded call reception according to an exemplary embodiment of the present invention.

Referring to FIG. 2, it is assumed that the electronic device includes three SIM cards 203, 209, and 207 and the SIM cards are assigned phone numbers of 123, 456, and 789 respectively. That is, the user uses the single electronic device with three SIM cards (e.g., the first SIM card, the second SIM card, and the third SIM card) of the phone numbers 123, 456 and 789. It is assumed that the call forwarding order between the three SIM cards is the first SIM card 203, the third SIM card 207, and the second SIM card 209.

First, it is assumed that a user of an electronic device A 201 makes a call to the phone number 123 of the first SIM card using the electronic device A 201. The first SIM card 203 registered to a service of a first network 202 commences communication with the electronic device A 201 by receiving the call over the first network 202. Next, a user of an electronic device B 204 is assumed to make a call to the phone number 789 of the third SIM card using the electronic device B 204. When the electronic device B 204 registered to a service of a fourth network 205 receives the call over the fourth network 205, the fourth network 205 resends the call to a third network 206 to which the third SIM card 207 is registered and sends the call to the phone number 789 of the third SIM card 207.

Next, the third SIM card 207 receiving the call request confirms no service area and sends call forwarding information to the third network 206. When the third network 206 receiving the call forwarding information from the electronic device sends the received call forwarding information to the fourth network 205, the fourth network 205 sends the call to a second network 208 in order to try the call to the phone number 456 of the second SIM card 209. When the second network 208 tries the call to the phone number 456 of the second SIM card 209, the electronic device confirms the second SIM card 209 out of the service area and sends the call forwarding information back to the second network 208.

The second network 208 receives the call forwarding information from the electronic device and sends the received call forwarding information back to the fourth network 205. The fourth network 205 receiving the call forwarding information sends the call to the electronic device over the first network 202 in order to try the call to the phone number 123 of the first SIM card 203. Hence, the electronic device confirms that the call reception is requested from the phone number 789 of the third SIM card 207 and displays a message inquiring of the user about whether to suspend the current call with the electronic device A 201 and to switch to the call of the electronic device B 204. That is, the user of the electronic device including the three SIM cards may suspend the current call and select the new call using the call waiting function.

Figure 3A:
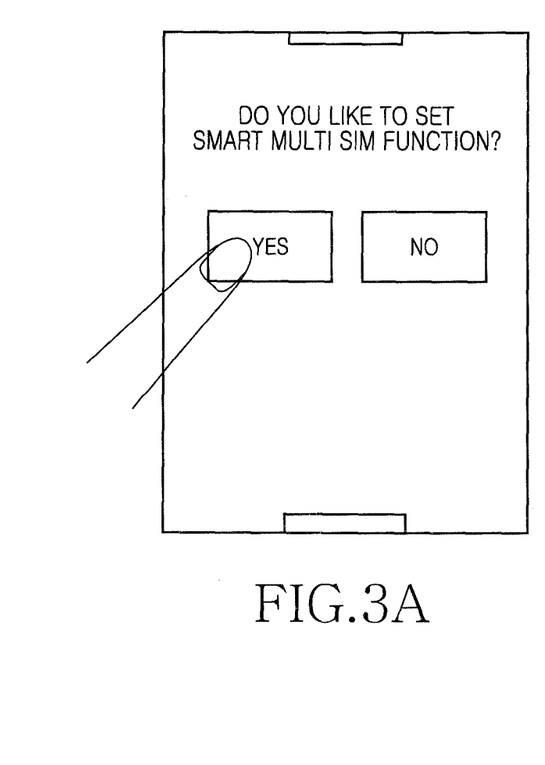
FIGS. 3A and 3B illustrate setup of a smart multi SIM function according to an exemplary embodiment of the present invention.
Figure 3B:
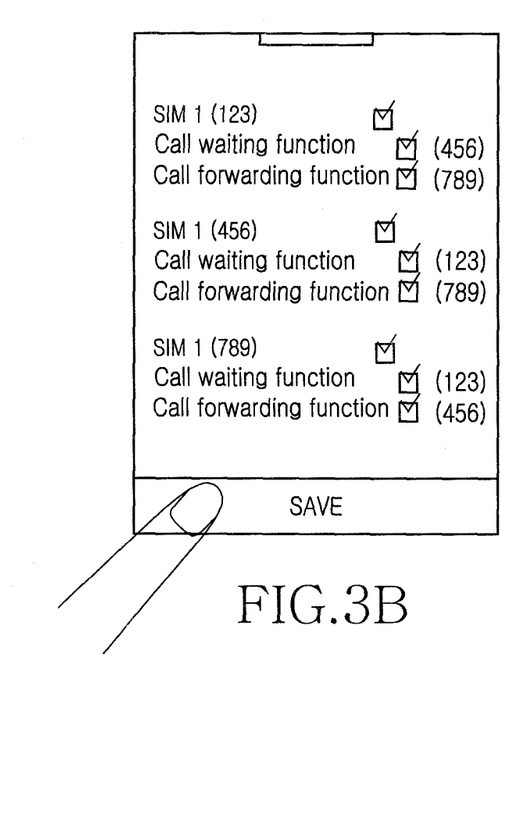

FIGS. 3A and 3B depict a setup of a smart multi SIM function according to an exemplary embodiment of the present invention.

In particular, FIG. 3A depicts a message display regarding the setup of the smart multi SIM card function according to an exemplary embodiment of the present invention. Referring to FIG. 3A, the electronic device displays the message inquiring about whether to set the smart multi SIM card function on its touch screen. When receiving a command to set the smart multi SIM card function, the electronic device can automatically set the call waiting function and the call forwarding function according to the fixed SIM card order out of the service area. More specifically, the electronic device receiving the smart multi SIM card function setup can set the call waiting function and the call forwarding function based on the fixed SIM card order out of the service area by automatically reading the subscriber information from the current multiple SIM cards of the electronic device.

FIG. 3B depicts that the smart multi SIM function is displayed. Referring to FIG. 3B, it is assumed that the electronic device can include multiple SIM cards, the phone number 123 is assigned to the first SIM card, the phone number 456 is assigned to the second SIM card, and the phone number 789 is assigned to the third SIM card among the three SIM cards of the electronic device.

To guide the easy smart multi SIM function setup to the user, the electronic device displays a message about the smart multi SIM function on its touch screen. More specifically, once the user selects the call waiting function and the call forwarding function with respect to the SIM cards displayed on the touch screen of the electronic device, the call waiting function and the call forwarding function of the SIM cards are automatically input. For example, the user can easily select the call waiting function by selecting the call waiting function with respect to the SIM cards displayed on the touch screen of the electronic device. The user can easily select the call forwarding function by selecting the call forwarding function with respect to the SIM cards displayed on the touch screen of the electronic device.

That is, when the user selects the call forwarding function of the first SIM card, the call to the phone number 123 of the first SIM card can be redirected to the phone number 456 of the second SIM card and the phone number 789 of the third SIM card. Likewise, when the user selects the call forwarding function of the second SIM card, the call to the phone number 456 of the second SIM card can be redirected to the phone number 123 of the first SIM card and the phone number 789 of the third SIM card. When the user selects the call forwarding function of the third SIM card, the call to the phone number 789 of the third SIM card can be redirected to the phone number 123 of the first SIM card and the phone number 456 of the second SIM card.

To input the call forwarding function in the related art, the user has to manually input detailed items one by one, thus deteriorating user convenience. In addition, a user who is unfamiliar with the electronic device and purchases the electronic device including two or more SIM cards, undergoes many trials and errors to set the call forwarding function. In contrast, the present electronic device can allow the user to easily set the call waiting function and the call forwarding function for the multi SIM active function and thus enhance the user's convenience.

Figure 4A:
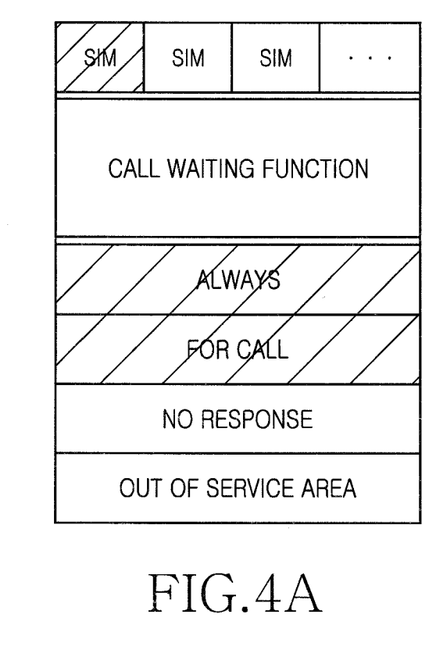
FIGS. 4A and 4B illustrate an avoiding infinite loop function according to an exemplary embodiment of the present invention.
Figure 4B:
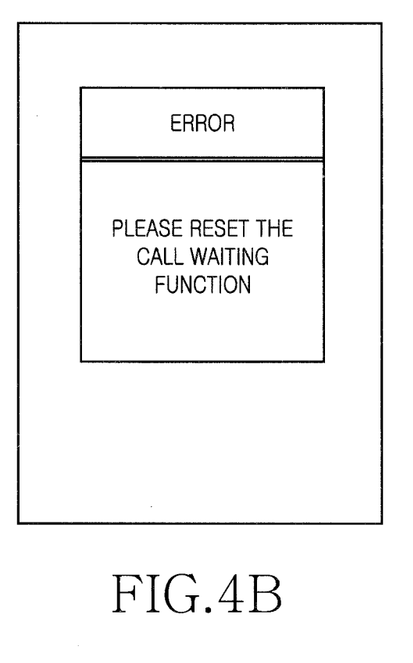

FIGS. 4A and 4B depict an avoiding infinite loop function according to an exemplary embodiment of the present invention.

The avoiding infinite loop function prevents the electronic device from missing a call because of the infinite loop. More specifically, the error message is displayed when the call forwarding function out of the service area is overlappingly selected with the setting for the ACTIVATE ALWAYS or the ACTIVATE FOR CALL between the multiple SIM cards among the detailed settings of the call forwarding function.

Referring to FIG. 4A, when the user selects the call waiting function to manually set the call forwarding function, the detailed settings of the call waiting function are displayed on the touch screen of the electronic device. The detailed settings can include the setting for activating the call forwarding function all the time, a setting for activating the call forwarding function for the call, a setting for no response, and the setting for no service range. Herein, when the user out of the service area overlappingly selects the call forwarding function between the multiple SIM cards and the setting for activating the call forwarding function always or for the call, the electronic device can miss the call because of the infinite loop. For example, it is assumed that, when the user sets the call forwarding function of the first SIM card and the call is received to the phone number of the first SIM card, the call forwarding function is set always at the phone number of the third SIM card. Next, when the call is received to the phone number of the first SIM card during the call to the phone number of the third SIM card, the electronic device checks the call forwarding function of the current first SIM card. That is, the electronic device confirms that the call forwarding function of the first SIM card always forwards the incoming call to the phone number of the third SIM card. Next, the electronic device redirects the call to the first SIM card phone number, to the third SIM card phone number. However, since the third SIM card receiving the forwarded call from the first SIM card is busy, the call is redirected to the first SIM card endlessly.

However, when the user manually inputs the call forwarding function and selects the setting for activating the call forwarding function always or for the call, the present electronic device can avoid the infinite loop of the user by displaying the error message. Referring to FIG. 4B, an the error message is shown on the touch screen of the electronic device upon the user selecting the setting for activating the call forwarding function always or for the call while manually inputting the call forwarding function. Thus, the present multi SIM active function including the avoiding infinite loop function enhances the user convenience.

Figure 5:
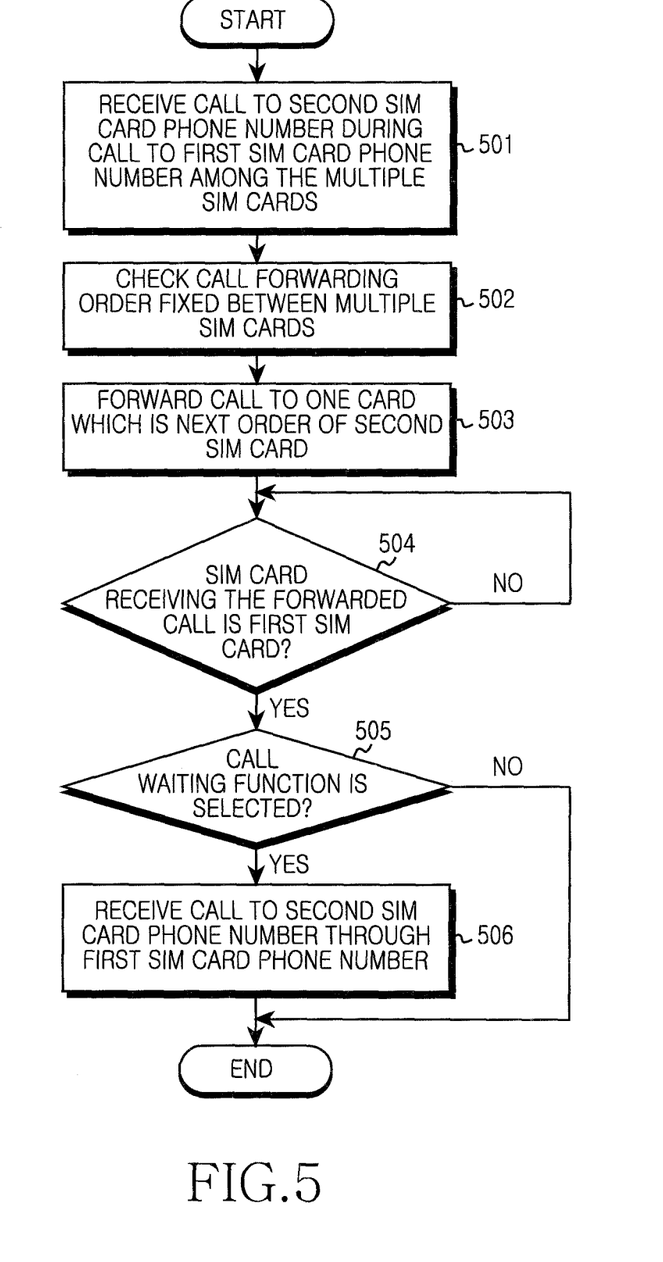
FIG. 5 illustrates operations of an electronic device including multiple SIM cards according to an exemplary embodiment of the present invention.

FIG. 5 illustrates operations of the electronic device including the multiple SIM cards according to an exemplary embodiment of the present invention.

Referring to FIG. 5, the electronic device receives the call to the second SIM card phone number during the call to the first SIM card phone number among the multiple SIM cards in step 501. In more detail, the electronic device can include two or more multiple SIM cards, and the separate phone numbers are given to the multiple SIM cards. That is, as many phone numbers as the number of SIM cards can be used in the single electronic device.

In step 502, the electronic device checks the call forwarding order between the multiple SIM cards. More specifically, the order can define that the SIM card forwards the call to only one SIM card and the SIM card receiving the forwarded call does not redirect the call to the SIM card which forwards the call. In further detail, the electronic device forwards the call in the fixed order, and the fixed order defines that the SIM card merely forwards the call to only one SIM card, not to two or more SIM cards at the same time. Likewise, the SIM card can receive the forwarded call from only one SIM card, not from two or more SIM cards at the same time. Yet, the two or more SIM cards of the electronic device should forward the call at least once and receive the forwarded call at least once.

In step 503, the electronic device forwards the call to a card which is the next order of the second SIM card. For example, it is assumed that the electronic device includes three SIM cards (e.g., a first SIM card, a second SIM card, and a third SIM card), and the call forwarding order is fixed to the first SIM card, the second SIM card, and the third SIM card. When the electronic device is engaged with the call to the first SIM card phone number and receives the incoming call to the second SIM card phone number, the electronic device confirms that the second SIM card phone number is out of the service range and forwards the call to the third SIM card being the next order.

In step 504, the electronic device determines whether the SIM card receiving the forwarded call is the first SIM card. In detail, since the electronic device is engaged with the call to the first SIM card phone number, the electronic device continues the call forwarding until it determines that the first SIM card receives the forwarded call. Likewise, after forwarding the call to the third SIM card, the electronic device confirms that the third SIM card is currently out of the service area and forwards the call to the first SIM card of the next call forwarding order.

Upon confirming that the first SIM card receives the forwarded call, the electronic device determines whether the call waiting function is selected in step 505. In detail, when the electronic device is engaged with the call to the phone number assigned to the first SIM card and receives the call request to the phone number assigned to the second SIM card, the electronic device can suspend the current call and receive the new call by selecting the call waiting function.

When the call waiting function is selected, the electronic device receives the call to the second SIM card phone number through the first SIM card phone number in step 506. When the electronic device of the related art including the multiple SIM cards is engaged with the call to the phone number of any one SIM card and receives the call request to another SIM card phone number, the incoming call is missed because the call is not forwarded to the current SIM card. More specifically, when the electronic device including two or more SIM cards is engaged with the call to the phone number of any one SIM card and receives the call request to another SIM card phone number, the call is forwarded to the current SIM card only if the call forwarding is preset from the SIM card receiving the call request to the current SIM card. To address such a drawback, the present disclosure proposes to fix the call forwarding order such that every SIM card forwards the call to any one SIM card at least once and receives the call from any one SIM card at least once because the SIM card for forwarding the call can redirect the call to only one SIM card and the SIM card can receive the forwarded call from only one SIM card. Thus, the call forwarding function which is the proper function of the electronic device including the multiple SIM cards is feasible, and as many phone numbers as the number of SIM cards can be used simultaneously in the single electronic device. When the call waiting function is not selected in step 505, the electronic device can continue the current call.

Figure 6:
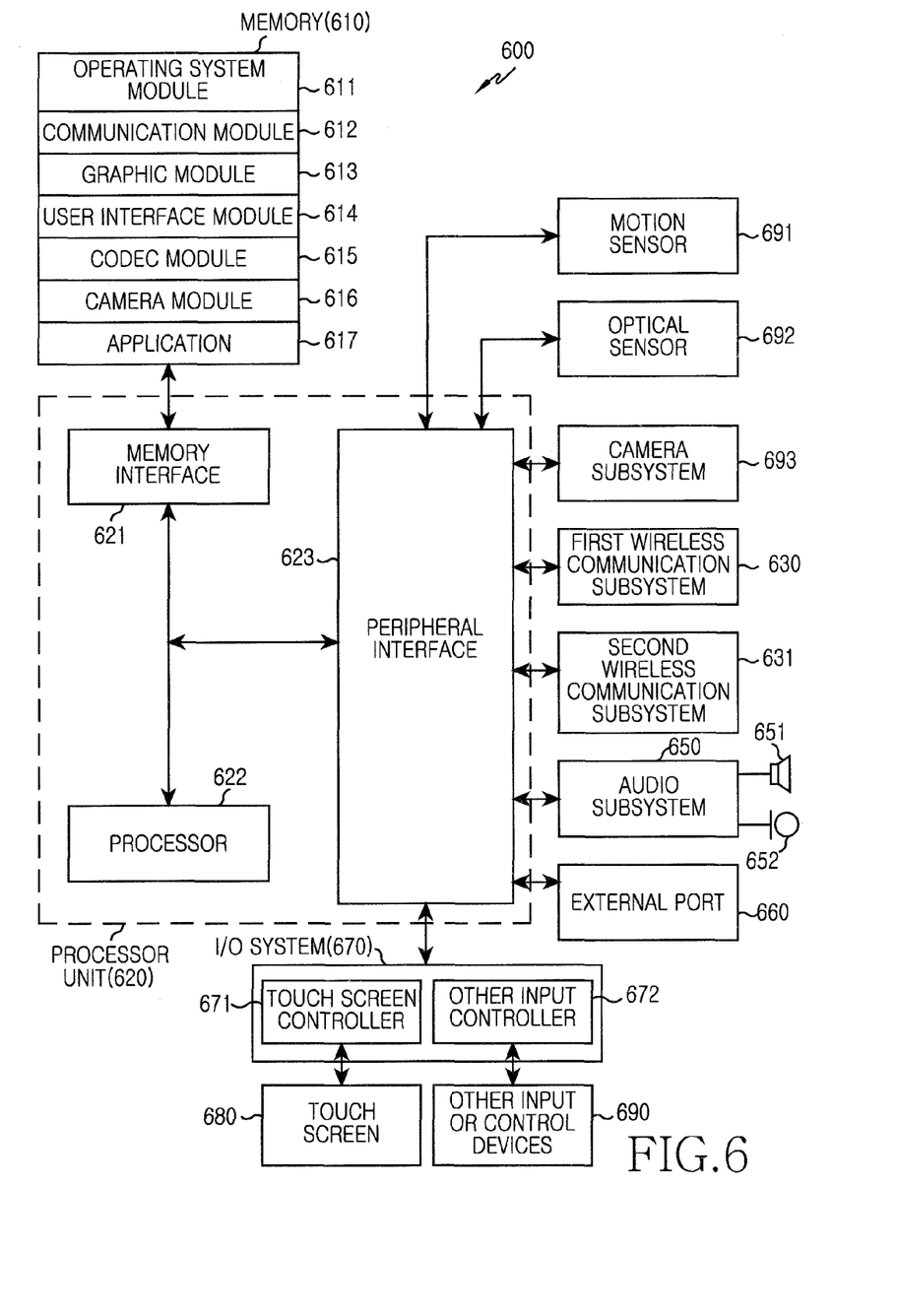
FIG. 6 illustrates the electronic device according to an exemplary embodiment of the present invention.

FIG. 6 is a block diagram of the electronic device according to an exemplary embodiment of the present invention.

Referring to FIG. 6, the electronic device 600 can be a portable electronic device, for example, portable terminal, mobile phone, mobile pad, media player, tablet computer, handheld computer, or Personal Digital Assistant (PDA). The electronic device 600 may be a portable electronic device combining two or more functions of those devices.

The electronic device 600 includes a memory 610, a processor unit 620, a first wireless communication subsystem 630, a second wireless communication subsystem 631, an external port 660, an audio subsystem 650, a speaker 651, a microphone 652, an Input/Output (I/O) system 670, a touch screen 680, and other input or control devices 690, a motion sensor 691, and optical sensor 692, and a camera subsystem 693. A plurality of memories 610 and a plurality of external ports 660 can be used.

The processor unit 620 can include a memory interface 621, one or more processors 622, and a peripheral interface 623. In some cases, the processor unit 620 may be referred to as a processor. The processor unit 620 checks the call forwarding order between the multiple SIM cards, and redirects the call to the second SIM card phone number to the first SIM card phone number according to the fixed order. The processor unit 620 confirms no service area of the second SIM card phone number. The processor unit 620 confirms that the multi SIM card active function is set between the multiple SIM cards, forwards the call to one card which is set to the next order of the second SIM card, and repeats the call forwarding in the fixed order until the SIM card receiving the forwarded call is identified as the first SIM card. The processor unit 620 confirms the call forwarding order of the first SIM card, the second SIM card, the third SIM card, and the first SIM card, confirms no service area with the second SIM card phone number, forwards the call to the third SIM card being the next order of the second SIM card, confirms no service area with the third SIM card phone number, and forwards the call to the first SIM card.

The processor 622 performs various functions for the electronic device 600 by running various software programs, and processes and controls voice communication and data communication. In addition to such typical functions, the processor 622 also executes a software module (e.g., an instruction set) stored in the memory 610 and performs various particular functions corresponding to the module. That is, the processor 622 carries out the methods described in the present disclosure in association with software modules stored in the memory 610.

The processor 622 can include one or more data processors, an image processor, and a CODEC. The data processor, the image processor, and the CODEC may be separately provided. Alternatively, the processor 622 may include a plurality of processors for performing different functions. The peripheral interface 623 connects the I/O subsystem 670 of the electronic device 600 and various peripherals to the processor 622 and the memory 610.

The various components of the electronic device 600 can be coupled using one or more communication buses or one or more stream lines.

The external port 660 is used to connect the electronic device 600 to other electronic devices directly or indirectly via a network (e.g., Internet, intranet, and wireless Local Area Network (LAN)). The external port 660 can be, for example, but not limited to, a Universal Serial Bus (USB) port or a FIREWIRE port.

A motion sensor 691 and a first optical sensor 692 are coupled to the peripheral interface 623 to allow various functions. For example, the motion sensor 691 and the first optical sensor 692 are coupled to the peripheral interface 623 to detect motion of the electronic device and the light from the outside. Besides, a positioning system and other sensors such as temperature sensor or bionic sensor can be coupled to the peripheral interface 623 to perform their functions.

A camera subsystem 693 performs camera functions such as photo and video clip recording.

The optical sensor 692 can employ a Charged Coupled Device (CCD) or a Complementary Metal-Oxide Semiconductor (CMOS) device.

The communication function is conducted through the one or more of wireless communication subsystems 630 and 631. The wireless communication subsystems 630 and 631 can include radio frequency receiver and transmitter and/or optical (e.g., infrared light) receiver and transmitter. The first wireless communication subsystem 630 and the second wireless communication subsystem 631 can be distinguished based on the communication network of the electronic device 600. For example, the communication network can include a communication subsystem designed to operate over, but not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network and/or a Bluetooth network. Since the present invention requires Wi-Fi communication over a Wi-Fi network, the first wireless communication subsystem 630 and the second wireless communication subsystem 631 may be integrated into a single wireless communication subsystem.

The audio subsystem 650 can be coupled to the speaker 651 and the microphone 652 to process the input and the output of the audio stream such as voice recognition, voice reproduction, digital recording, and telephone function. That is, the audio subsystem 650 communicates with the user through the speaker 651 and the microphone 652. The audio subsystem 650 receives a data stream through the peripheral interface 623 of the processor unit 620 and converts the received data stream to an electric signal. The converted electric signal is fed to the speaker 651. The speaker 651 converts the electric signal to a sound wave audible by the user and outputs the sound wave. The microphone 652 converts the sound wave from the user or other sound sources to an electric signal. The audio subsystem 650 receives the converted electric signal from the microphone 652. The audio subsystem 650 converts the received electric signal to an audio data stream and sends the converted audio data stream to the peripheral interface 623. The audio subsystem 650 can include an attachable and detachable ear phone, head phone, or head set.

The I/O subsystem 670 can include a touch screen controller 671 and/or other input controller 672. The touch screen controller 671 can be coupled to the touch screen 680. The touch screen 680 and the touch screen controller 671 can detect the contact and the motion or their abortion using, but not limited to, capacitive, resistive, infrared and surface sound wave techniques for determining one or more contact points with the touch screen 680 and a multi-touch detection technique including various proximity sensor arrays or other elements. The other input controller 672 can be coupled to the other input/control devices 690. The other input/control devices 690 can include one or more buttons, a rocker switch, a thumb wheel, a dial, a stick, and/or a pointer such as stylus.

The touch screen 680 provides the I/O interface between the electronic device 600 and the user. That is, the touch screen 680 forwards the user's touch input to the electronic device 600. The touch screen 680 also functions as a medium for displaying the output of the electronic device 600 to the user. That is, the touch screen 680 displays a visual output to the user. The visual output can be represented as text, graphic, video, and a combination of these.

The touch screen 680 can employ various displays, examples of which include, but are not limited to, Liquid Crystal Display (LCD), Light Emitting Diode (LED), Light emitting Polymer Display (LPD), Organic LED (OLED), Active Matrix OLED (AMOLED) or Flexible LED (FLED). Herein, when the SIM card for receiving the forwarded call is identified as the first SIM card, the touch screen 680 displays a message inquiring about whether to receive the incoming call to the second SIM card phone number, using the first SIM card phone number.

The memory 610 can be coupled to the memory interface 621. The memory 610 can include fast Random Access Memory (RAM) such as one or more magnetic disc storage devices, non-volatile memory, one or more optical storage devices, and/or a flash memory (e.g., NAND and NOR).

The memory 610 stores software. Software components include an operating system module 611, a communication module 612, a graphic module 613, a user interface module 614, a CODEC module 615, a camera module 616, and one or more application modules 617. The modules being the software components can be represented as a set of instructions, and thus the module can be referred to as an instruction set. Also, the module may be referred to as a program. The operating system software 611 (e.g., the embedded operating system such as WINDOWS, LINUX, Darwin, RTXC, UNIX, OS X, or VxWorks) includes various software components for controlling general system operations. These include, e.g., memory management and control, storage hardware (device) control and management, and power control and management. The operating system software 611 processes normal communication between various hardware (e.g., devices) and software components (e.g., modules).

The communication module 612 allows communication with an external electronic device such as computer, server, and/or portable terminal, through the wireless communication subsystems 630 and 631 or the external port 660. Herein, the communication module 612 receives the call to the second SIM card phone number during the call to the first SIM card phone number among the multiple SIM cards.

The graphic module 613 includes various software components for providing and displaying graphics on the touch screen 680. The term 'graphics' encompasses text, webpage, icon, digital image, video, and animation.

The user interface module 614 includes various software components relating to a user interface. The user interface module 614 is involved in status change of the user interface and a condition of the user interface status change.

The CODEC module 615 can include software components relating to the encoding and the decoding of the video file. The CODEC module 615 can include a video stream module such as a Moving Picture Experts Group (MPEG) module and/or H204 module. The CODEC module 615 can include various audio file CODEC modules for AAA, AMR, and WMA. The CODEC module 615 includes the instruction set corresponding to the present method.

The camera module 616 includes camera related software components allowing camera related processes and functions.

The application module 617 may further include a browser, an e-mail, an instant message, a word processing, keyboard emulation, an address book, a touch list, a widget, Digital Right Management (DRM), voice recognition, voice reproduction, a position determining function, and a location based service.

The various functions of the electronic device 600 as stated above and to be explained, can be executed by hardware and/or software and/or their combination including one or more stream processing and/or Application Specific Integrated Circuits (ASICs).

As set forth above, the electronic device including the multiple SIM cards and the method thereof can securely receive the call to another SIM card phone number even during the call to one SIM card phone number among the multiple SIM cards.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of an electronic device comprising at least two multiple Subscriber Identity Module (SIM) cards, the method comprising:
   receiving a call to a phone number assigned to a second SIM card during a call to a phone number assigned to a first SIM card among the multiple SIM cards;
   checking a call forwarding order fixed between the multiple SIM cards; and
   forwarding the call to the second SIM card phone number, to the first SIM card phone number according to the fixed order.

2. The method of claim 1, further comprising:
   determining no service area with the second SIM card phone number.

3. The method of claim 1, further comprising:
   determining that a smart multi SIM card function is set between the multiple SIM cards.

4. The method of claim 3, wherein the smart multi SIM card function comprises a call waiting function which holds the call to any one of the multiple SIM cards.

5. The method of claim 3, wherein the smart multi SIM card function comprises a call forwarding function which, when a call to another SIM card phone number is received during a current call to any one of the multiple SIM cards, redirects the call to the other SIM card phone number, to the SIM card phone number of the current call according to the fixed order.

6. The method of claim 3, wherein the smart multi SIM card function comprises a dynamic call diverting function which immediately executes the smart multi SIM card function when a SIM card other than the inserted multiple SIM cards is inserted.

7. The method of claim 3, wherein the smart multi SIM card function comprises an avoiding infinite loop function which displays an error message when a setting for always activating the call forwarding function or a setting for setting the call forwarding function for the call is selected among settings of the call forwarding function.

8. The method of claim 1, wherein the order is fixed such that a SIM card for forwarding the call redirects the call to only one of the multiple SIM cards and the SIM card for receiving the forwarded call receives the forwarded call from only one of the multiple SIM cards so that every SIM card forwards the call to any one SIM card at least once and receives the forwarded call from any one SIM card at least once.

9. The method of claim 1, wherein the forwarding of the call to the second SIM card phone number, to the first SIM card phone number according to the fixed order comprises:
   forwarding to any one card which is set to a next order of the second SIM card; and
   repeating the call forwarding in the fixed order until the SIM card receiving the forwarded call is identified as the first SIM card.

10. The method of claim 9, further comprising:
    when the SIM card receiving the forwarded call is identified as the first SIM card, displaying a message inquiring about whether to receive the call to the second SIM card phone number using the first SIM card phone number.

11. The method of claim 1, wherein the forwarding of the call to the second SIM card phone number, to the first SIM card phone number according to the fixed order comprises:
    confirming that the call forwarding order is fixed to the first SIM card, the second SIM card, the third SIM card, and the first SIM card;
    determining no service area with the second SIM card phone number;
    forwarding the call to the third SIM card which is set to a next order of the second SIM card;
    determining no service area with the third SIM card phone number; and
    forwarding the call to the first SIM card which is set to a next order of the third SIM card.

12. An electronic device comprising at least two multiple Subscriber Identity Module (SIM) cards, the electronic device comprising:
    a communication module for receiving a call to a phone number assigned to a second SIM card during a call to a phone number assigned to a first SIM card among the multiple SIM cards; and
    a processor unit for checking a call forwarding order fixed between the multiple SIM cards, and forwarding the call to the second SIM card phone number, to the first SIM card phone number according to the fixed order.

13. The electronic device of claim 12, wherein the processor unit determines no service area with the second SIM card phone number.

14. The electronic device of claim 12, wherein the processor unit determines that a smart multi SIM card function is set between the multiple SIM cards.

15. The electronic device of claim 14, wherein the smart multi SIM card function comprises a call waiting function which holds the call to any one of the multiple SIM cards.

16. The electronic device of claim 14, wherein the smart multi SIM card function comprises a call forwarding function which, when a call to another SIM card phone number is received during a current call to any one of the multiple SIM cards, redirects the call to the other SIM card phone number, to the SIM card phone number of the current call according to the fixed order.

17. The electronic device of claim 14, wherein the smart multi SIM card function comprises a dynamic call diverting function which immediately executes the smart multi SIM card function when a SIM card other than the inserted multiple SIM card is inserted.

18. The electronic device of claim 14, wherein the smart multi SIM card function comprises an avoiding infinite loop function which displays an error message when a setting for always activating the call forwarding function or a setting for setting the call forwarding function for the call is selected in detailed among settings of the call forwarding function.

19. The electronic device of claim 12, wherein the order is fixed such that a SIM card for forwarding the call redirects the call to only one of the multiple SIM cards and the SIM card for receiving the forwarded call receives the forwarded call from only one of the multiple SIM cards so that every SIM card forwards the call to any one SIM card at least once and receives the forwarded call from any one SIM card at least once.

20. The operating method of claim 12, wherein the processor unit forwards to any one card which is set to a next order of the second SIM card, and repeats the call forwarding in the fixed order until the SIM card receiving the forwarded call is identified as the first SIM card.

21. The electronic device of claim 20, further comprising:
a touch screen for, when the SIM card receiving the forwarded call is identified as the first SIM card, displaying a message inquiring about whether to receive the call to the second SIM card phone number using the first SIM card phone number.

22. The electronic device of claim 12, wherein the processor unit confirms that the call forwarding order is fixed to the first SIM card, the second SIM card, the third SIM card, and the first SIM card, determines that the call is not allowed at the third SIM card phone number when the call is not allowed at the second SIM card phone number, forwards the call to the third SIM card which is set to a next order of the second SIM card, determines no service area with the third SIM card phone number, and forwards the call to the first SIM card which is set to a next order of the third SIM card.

23. An electronic device comprising at least three Subscriber Identity Module (SIM) cards, the electronic device comprising:
a communication module configured to receive a call to a phone number assigned to a second SIM card of the at least three SIM cards of the electronic device during a call to a phone number assigned to a first SIM card among the at least three SIM cards; and
a processor unit for checking a call forwarding order fixed between the at least three SIM cards, and for forwarding the call to the second SIM card phone number, to the first SIM card phone number according to the fixed order.

* * * * *